United States Patent
Cope et al.

(10) Patent No.: US 9,485,129 B1
(45) Date of Patent: Nov. 1, 2016

(54) MULTI-STANDARD PEAK CANCELING CIRCUITRY

(71) Applicant: Altera Corporation, San Jose, CA (US)

(72) Inventors: Benjamin Thomas Cope, London (GB); Volker Mauer, Princes Risborough (GB); Shahin Gheitanchi, Maidenhead (GB); Nima Safari, High Wycombe (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/325,184

(22) Filed: Jul. 7, 2014

(51) Int. Cl.
H04L 27/26 (2006.01)

(52) U.S. Cl.
CPC .................. H04L 27/2623 (2013.01)

(58) Field of Classification Search
CPC ........................ H04L 27/2614; H04L 27/2623
See application file for complete search history.

(56) References Cited

U.S. PATENT DOCUMENTS

| | | | |
|---|---|---|---|
| 4,994,692 A * | 2/1991 | Wolke ................... | H03K 5/086 327/50 |
| 6,175,551 B1 | 1/2001 | Awater et al. | |
| 6,219,534 B1 * | 4/2001 | Torii ..................... | H03D 3/009 375/349 |
| 7,061,991 B2 | 6/2006 | Wright et al. | |
| 7,590,198 B2 | 9/2009 | Sanada et al. | |
| 7,697,591 B2 | 4/2010 | Copeland | |
| 8,670,502 B2 * | 3/2014 | Morris et al. ................. | 375/296 |
| 2004/0190734 A1 * | 9/2004 | Kates ..................... | H03G 7/06 381/106 |
| 2005/0063485 A1 * | 3/2005 | Hasegawa et al. ........... | 375/296 |
| 2006/0062057 A1 | 3/2006 | Blasi et al. | |
| 2006/0098765 A1 * | 5/2006 | Thomas et al. ............... | 375/346 |
| 2006/0189282 A1 * | 8/2006 | Hasegawa et al. ........ | 455/127.1 |
| 2008/0150625 A1 * | 6/2008 | Sundstrom ................... | 327/551 |
| 2008/0153435 A1 * | 6/2008 | Hirano et al. ................. | 455/108 |
| 2008/0292014 A1 * | 11/2008 | Naito ............................ | 375/260 |
| 2009/0028220 A1 * | 1/2009 | Roh et al. ..................... | 375/136 |
| 2009/0225898 A1 * | 9/2009 | Abe .............................. | 375/296 |
| 2012/0140849 A1 * | 6/2012 | Bercovich .......... | H04L 25/0204 375/296 |
| 2012/0163489 A1 | 6/2012 | Ramakrishnan | |
| 2013/0115899 A1 * | 5/2013 | Hansen ...................... | 455/114.2 |
| 2013/0243045 A1 * | 9/2013 | Hayashi ............... | H04L 27/367 375/219 |
| 2014/0169496 A1 * | 6/2014 | Yang ................... | H04L 27/2626 375/296 |
| 2014/0348266 A1 * | 11/2014 | Yamanouchi ................. | 375/297 |
| 2015/0030099 A1 * | 1/2015 | Ding ................... | H04L 27/2623 375/295 |

OTHER PUBLICATIONS

Cope, U.S. Appl. No. 13/625,782, filed Sep. 24, 2012.

* cited by examiner

*Primary Examiner* — Jean B Corrielus
(74) *Attorney, Agent, or Firm* — Treyz Law Group; Jason Tsai

(57) ABSTRACT

Integrated circuits with wireless communications circuitry having peak cancelation circuitry operable to perform crest factor reduction is provided. The peak cancelation circuitry may receive at least first and second carrier waveforms and may include at least a first canceling pulse generator (CPG), a second CPG, a first peak detector for performing peak detection on the first waveform, a second peak detector for performing peak detection on the second waveform, a third peak detector for performing peak detection on a combined waveform of the first and second waveforms, and a pulse allocator that receives clipping information from the three peak detectors and that controls the amount of peak cancelation that is being performed by the two CPGs. The allocator may determine whether the combined waveform contains any peaks. In response to determining that the combined waveform does not contain any peaks, the CPGs may be configured in bypass mode.

15 Claims, 7 Drawing Sheets

MULTI-STANDARD PEAK CANCELING CIRCUITRY

BACKGROUND

This relates generally to integrated circuits, and more particularly, to integrated circuits with wireless communications circuitry.

Wireless integrated circuits such as transceiver circuits are sometimes configured to support complex, non-constant envelope modulation schemes such as the Wideband Code Division Multiple Access (W-CDMA) modulation scheme and the Orthogonal Frequency-Division Multiplexing Access (OFDMA) modulation scheme. High frequency signals generated using such types of radio access standards can exhibit high peak-to-average ratios (PARs), which can adversely impact the efficiency of radio-frequency power amplifiers used in wireless base transceiver stations (as an example). Reducing the PAR of these signals can help increase power amplifier efficiency and allows for higher average power to be transmitted.

In an effort to reduce signal PAR, a crest factor reduction (CFR) algorithm has been developed that involves iteratively cancelling unwanted signal peaks. In multi-standard applications, a CFR processor may simultaneously receive a first signal waveform associated with a first standard such as W-CDMA and a second signal waveform associated with a second standard such as OFDMA. The first and second waveforms are summed together prior to transmission with the power amplifier.

In a first scenario, peak cancellation operations are performed separately on the first and second waveforms prior to the waveforms being summed together. In this scenario, there is a chance that the first and second waveforms exhibit complementary peaks that actually cancel out with each other. In such cases, the peak cancellation being performed prior to the summation would be excessive. In a second scenario, peak cancelling operations are performed on the sum of the first and second waveforms. In this second scenario, there is a chance that the peak cancellation is subtracting power from the waveform with lower power contribution, which can result in unacceptably high error vector magnitude (EVM) degradation on the second waveform.

SUMMARY

Integrated circuits may include wireless communications circuitry having peak cancelation circuitry configured to perform crest factor reduction. The peak cancelation circuitry may receive at least a first carrier waveform at a first input and a second carrier waveform at a second input. The first carrier waveform may be transmitted using a first wireless standard, whereas the second carrier waveform may be transmitted using a second wireless standard.

The peak canceling circuit may include a first canceling pulse generator (CPG) for performing peak canceling on the first carrier waveform, a second CPG for performing peak canceling on the second carrier waveform, a summing circuit for combining the first and second carrier waveforms to obtain an aggregated waveform, a first peak detector for performing peak detection on only the first carrier waveform, a second peak detector for performing peak detection on only the second carrier waveform, a third peak detector for performing peak detection on the aggregated waveform, and a pulse allocator that receives clipping information from the three peak detectors and that generates control signals for adjusting the amount of peak cancelation that is being performed by the first and second CPGs on the first and second carrier waveforms.

In particular, the pulse allocator may be used to determine whether the aggregated waveform contains any peaks. In response to determining that the aggregated waveform contains no peaks, the allocator may configure the CPGs in bypass mode (e.g., to configure the CPGs to simply pass through the first and second waveforms without performing any peak canceling). In response to determining that the aggregated waveform contains at least one peak, the allocator may generate separate weighting factors that individually adjust the amount by which the first and second CPGs perform CFR on the first and second carrier waveforms.

Further features of the present invention, its nature and various advantages will be more apparent from the accompanying drawings and the following detailed description.

DETAILED DESCRIPTION

Figure 1:
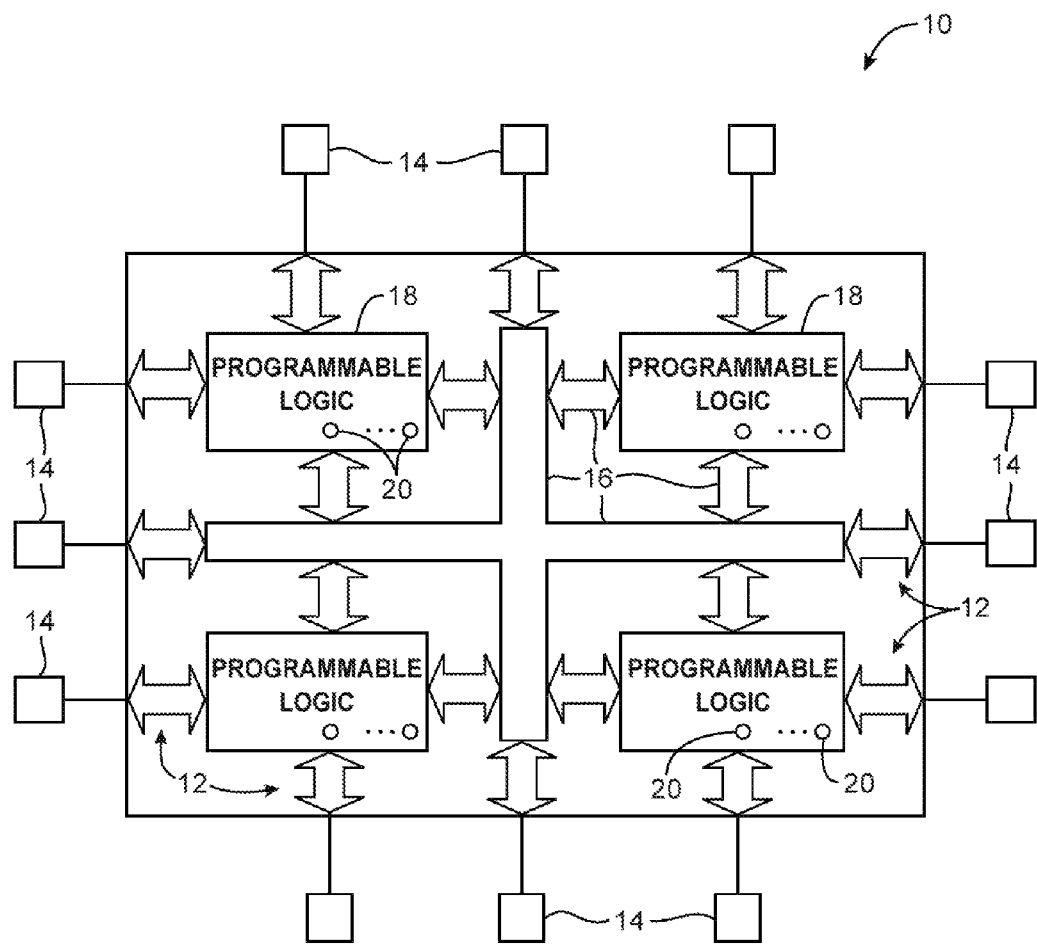
FIG. 1 is a diagram of an illustrative programmable integrated circuit in accordance with an embodiment of the present invention.

An illustrative integrated circuit of the type that may be provided with memory elements and associated circuits that can be controlled using output signals from the memory elements is shown in FIG. 1. As shown in FIG. 1, integrated circuit 10 may contain memory elements 20. Memory elements 20 may be loaded with configuration data to configure programmable transistors such as pass transistors (sometimes referred to as pass gates or pass gate transistors) in programmable circuitry (programmable logic) 18.

Because memory elements 20 may be used in storing configuration data for programmable logic 18, memory elements 20 may sometimes be referred to as configuration random-access memory elements (CRAM). Integrated circuit 10 may be configured to implement custom logic functions by configuring programmable logic 18, so integrated circuit 10 may sometimes be referred to as a programmable integrated circuit.

As shown in FIG. 1, programmable integrated circuit 10 may have input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 may include fixed interconnects (conductive lines) and programmable interconnects (i.e., programmable connections between respective fixed interconnects).

Programmable logic 18 may include combinational and sequential logic circuitry. Programmable logic 18 may be configured to perform a custom logic function. The programmable interconnects associated with interconnection resources 16 may be considered to form a part of programmable logic 18.

When memory elements 20 are loaded with configuration data, the memory elements each provide a corresponding static control output signal that controls the state of an associated logic component in programmable logic 18. The memory element output signals may, for example, be used to control the gates of metal-oxide-semiconductor (MOS) transistors such as n-channel metal-oxide-semiconductor (NMOS) pass transistors in programmable components such as multiplexers, logic gates such as AND gates, NAND gates, etc. P-channel transistors (e.g., a p-channel metal-oxide-semiconductor pass transistor) may also be controlled by output signals from memory elements 20, if desired. When a memory element output that is associated with an NMOS pass transistor is high, the pass transistor controlled by that memory element is turned on and passes logic signals from its input to its output. When the memory element output is low, an NMOS pass transistor is turned off and does not pass logic signals. P-channel metal-oxide-semiconductor (PMOS) pass transistors are turned on when the signal that is applied to its gate from the output of a memory element is low (e.g., 0 volts) and are turned off when the output of the memory element is high (i.e., the polarity for NMOS and PMOS control signals is reversed).

Configuration random-access memory elements 20 may be arranged in an array pattern. There may be, for example, millions of memory elements 20 on integrated circuit 10. During programming operations, the array of memory elements is provided with configuration data. Once loaded with configuration data, memory elements 20 may selectively control (e.g., turn on and off) portions of the circuitry in the programmable logic 18 and thereby customize the circuit functions of circuit 10.

The circuitry of programmable integrated circuit 10 may be organized using any suitable architecture. As an example, the circuitry of programmable integrated circuit 10 may be organized in a series of rows and columns of programmable logic blocks (regions) each of which contains multiple smaller logic regions. The logic resources of integrated circuit 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the circuitry of programmable integrated circuit 10 may be arranged in more levels or layers in which multiple large regions are interconnected to form still larger portions of logic. Still other device arrangements may use logic that is not arranged in rows and columns.

The example of FIG. 1 in which device 10 is described as a programmable integrated circuit is merely illustrative and does not serve to limit the scope of the present invention. The method and apparatus described herein may be incorporated into any suitable circuit. For example, the method and apparatus may also be incorporated into numerous types of devices such as microprocessors, digital signal processors, application specific standard products (ASSPs), application specific integrated circuits (ASICs), programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), just to name a few.

Figure 2:
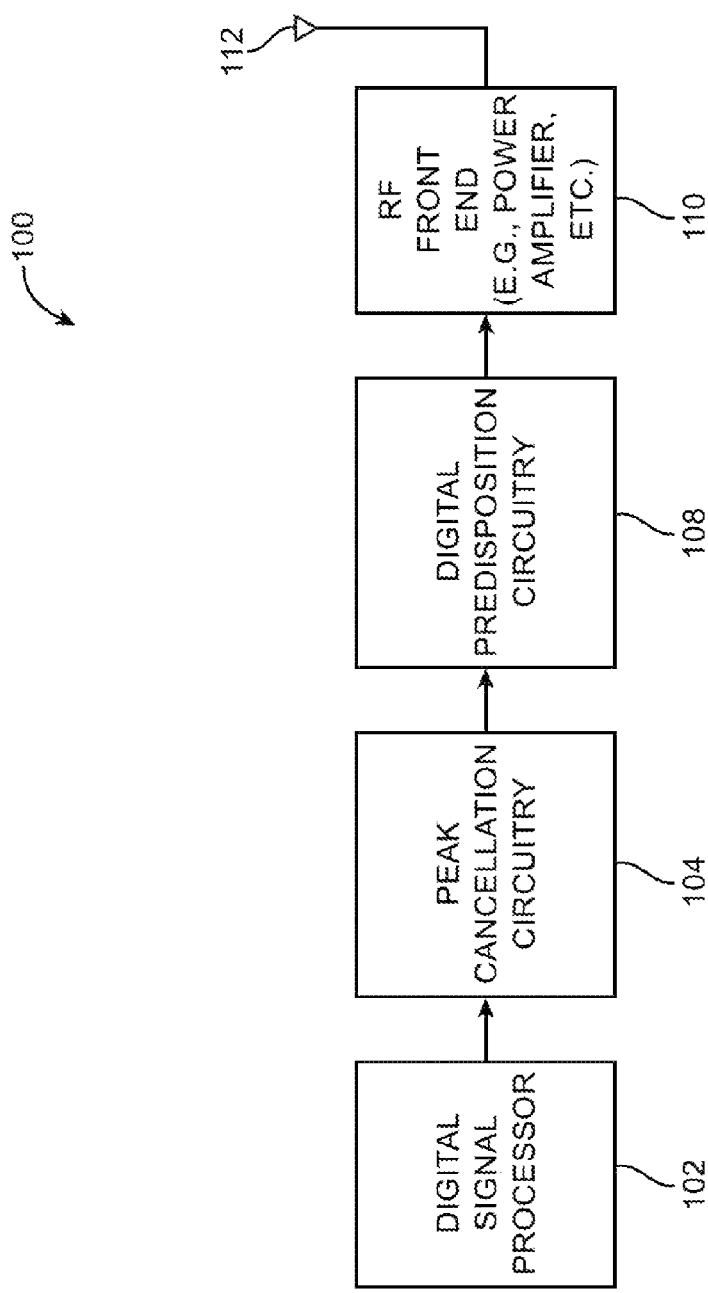
FIG. 2 is a diagram of illustrative wireless communications circuitry in accordance with an embodiment of the present invention.

In one suitable embodiment of the present invention, integrated circuits are used in wireless communications circuitry that supports radio-frequency communications capabilities. FIG. 2 shows wireless communications circuitry such as wireless communications circuitry 100. As shown in FIG. 2, wireless communications circuitry 100 may include a digital signal processor 102 (e.g., a digital baseband processor), peak canceling circuitry such as peak cancelation circuitry 104, digital predistortion (DPD) circuitry 108, a radio-frequency (RF) amplifying circuit such as RF power amplifier 110, and an antenna 112.

Baseband processor 102 may be used to handle raw and processed data associated with wireless (antenna) performance metrics for received signals such as received power, transmitted power, frame error rate, bit error rate, channel quality measurements based on signal-to-interference ratio (SINR) and signal-to-noise ratio (SNR) information, channel quality measurements based on signal quality data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 100.

When wireless communications circuitry 100 is transmitting radio-frequency signals, processor 102 may generate digital data (e.g., baseband signals) that is fed to peak canceling circuitry 104. Peak cancelling circuitry 104 may be used to reduce the dynamic range of the baseband signals (e.g., for performing "crest factor reduction" or CFR operations). Signals generated at the output of peak cancelling circuitry 104 may be fed through DPD circuitry 108 and power amplifier 110 to antenna 112 for wireless transmission.

The circuitry shown in FIG. 2 is merely illustrative and does not serve to limit the scope of the present invention. Antenna 112 may also be coupled to receiver circuitry (not shown) for processing signals received using antenna 112. Processor 102, peak canceling circuitry 104, and digital predistortion circuitry 108 may process digital signals at the baseband. Power amplifier 110 is sometimes considered to be part of a radio-frequency front end module that transmits analog signals at radio-frequency bands. The RF front end module may also include circuitry such as matching circuits, band-pass filters, mixers (e.g., frequency up-converters and down-converters), low noise amplifiers (LNAs), data converters (e.g., digital-to-analog converters and analog-to-digital converters), and other circuitry for processing signals that are transmitted and received via antenna 12.

In one suitable arrangement, peak cancelling circuitry 104 and DPD circuitry 108 may be formed on device 10. In another suitable arrangement, baseband processor 102, peak cancelling circuitry 104 and DPD circuitry 108 may be formed as part of device 10. In yet another suitable arrangement, baseband processor 102, peak cancelling circuitry 104, DPD circuitry 108, and RF front end module 110 may be formed as part of device 10. In general, integrated circuit 10 may include at least peak cancelling circuitry 104 and any associated wireless communications circuitry.

Figure 3A:
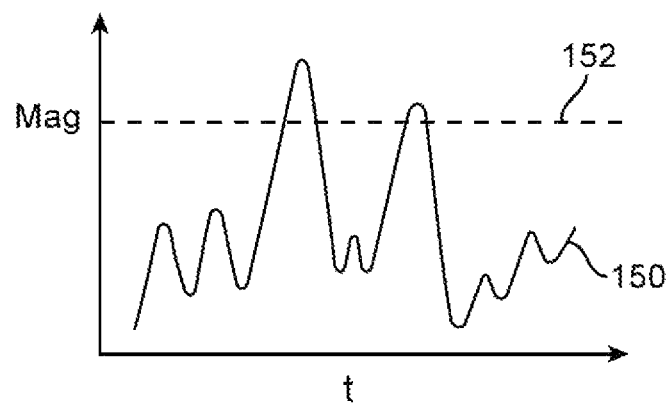
FIGS. 3A and 3B show waveforms exhibiting peaks that are being canceled in accordance with an embodiment of the present invention.
Figure 3B:
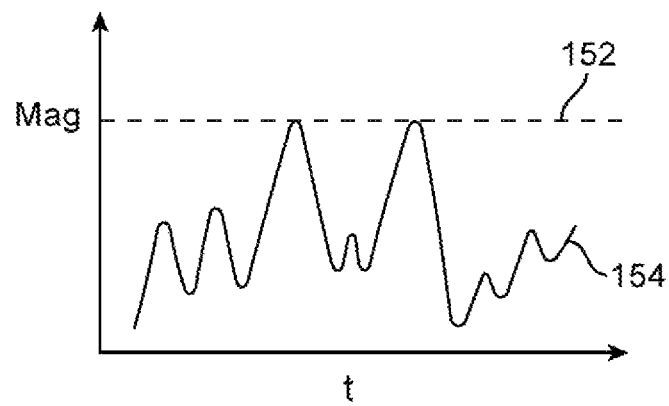

FIGS. 3A and 3B illustrate the basic concept of peak cancellation. FIG. 3A shows a waveform 150 that may be received at an input of a peak canceling circuit. As shown in FIG. 3A, waveform 150 may exhibit signal peaks that exceed a predetermined magnitude threshold level 152. In general, the term "peak" may refer to any portion of a signal waveform that exceeds some predetermined threshold level. The peak canceling circuit may include a peak detection circuit for detecting these peaks and may also include a pulse generation circuit for generating pulses for canceling out at least some of the detected peaks. As a result, a peak canceled waveform such as waveform 154 in FIG. 3B can be generated at an output of the peak canceling circuit. As shown in FIG. 3B, peak canceled waveform 154 is substantially similar to input waveform 150, except the peaks that previously exceed threshold 152 are no longer present (e.g., the peaks have been canceled out using the pulses generated by the pulse generation circuit).

Figure 4:
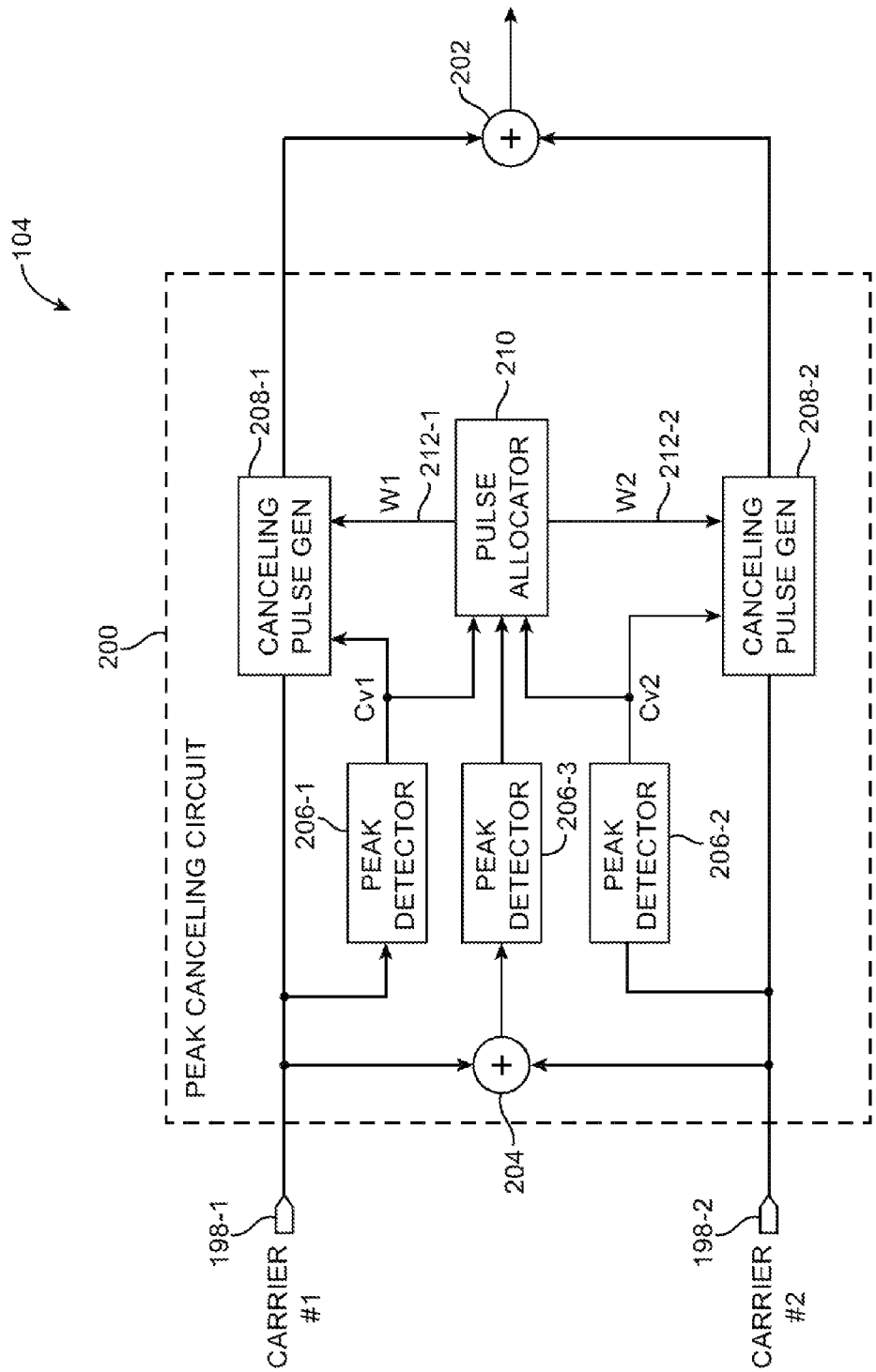
FIG. 4 is a diagram of an illustrative peak canceling circuit that includes a pulse allocator for controlling the amount of peak cancelling in separate data streams in accordance with an embodiment of the present invention.

Peak cancellation circuitry 104 of FIG. 2 may, in general, include one or more instances of a peak canceling circuit such as peak canceling circuit 200 (see, e.g., FIG. 4). The peak canceling circuit 200 of FIG. 4 may have a first input 198-1 configured to receive signals associated with a first carrier and a second input 198-2 configured to receive signals associated with a second carrier. In general, the first and second carriers operate at different center frequencies but may operate within a single radio-frequency (RF) band or in different radio-frequency bands. The first and second carriers may operate using different radio access standards/technologies or may operate using the same wireless standard. Peak canceling circuit 200 that is capable of handling signals from different carriers may therefore sometimes be referred to as a "multi-carrier" or "multi-standard" peak canceling circuit. A base station that includes such types of peak canceling circuit for performing crest factor reduction on multiple carrier waveforms may be referred to as a multi-standard remote radio head (as an example).

In a conventional multi-carrier CFR system that receives a first carrier waveform and a second carrier waveform, peak cancelling is either performed on an aggregated waveform (i.e., peak cancellation is performed on the sum of the first and second carrier waveforms) or on the first and second waveforms separately before being summed together.

Consider a first scenario in which the CFR is performed on first and second carrier waveforms separately. In this scenario, the first carrier waveform may have a positive peak, and the second carrier waveform may have a corresponding negative peak that partly cancels out with the positive peak in the first carrier waveform. In such cases, clipping each of the waveforms separately without knowledge of the aggregated waveform would result in unnecessary error vector magnitude (EVM) degradation in the transmitted signal. Error vector magnitude is a well-known wireless performance metric whose value may be reflective of the amount of carrier leakage, phase noise, distortion, spurious signals, and other undesired factors that are present and that degrade wireless performance. In general, clipping waveforms unnecessarily can cause EVM degradation, which is undesirable.

Consider a second scenario in which the CFR is performed on an aggregated waveform (i.e., on the sum of a first carrier waveform and a second carrier waveform). In particular, the first and second carrier waveforms may have the same EVM requirement; however, only the first waveform has a peak to cancel (i.e., the second waveform doesn't have any peaks that need canceling). In such scenarios, performing CFR on the aggregated waveform can result in unnecessary EVM degradation on the second carrier waveform since the CFR is potentially subtracting power from the low power contributing waveform (i.e., the second carrier waveform in this example).

Consider a third scenario in which the CFR is performed on an aggregated waveform of a first carrier waveform and a second carrier waveform. In particular, the second carrier may have a more severe EVM requirement than the first carrier; however, only the first carrier waveform has a peak to cancel, whereas the second carrier waveform does not have any comparable peaks that need canceling. In such scenarios, performing CFR on the aggregated waveform can result in unnecessary EVM degradation on the first carrier waveform since the CFR is potentially subtracting power from the first peaky carrier waveform with lower EVM requirements while it would actually be more desirable to apply peak cancelation on the second carrier waveform with the more severe EVM requirement, which could have smaller peaks at other locations.

The scenarios described above illustrate the deficiencies in conventional multi-carrier CFR systems (i.e., conventional multi-standard CFR systems fail to perform intelligent peak canceling of each carrier waveform based on the performance requirements of each carrier/standard).

In accordance with an embodiment, peak canceling circuit 200 of FIG. 4 may be provided with intelligent peak canceling capabilities that take into account the performance requirements associated with each carrier waveform or standard and that take into account characteristics of a summed waveform. Such information can be used by circuit 200 to fine tune the amount of CFR that is separately performed on each of the multiple carrier waveforms to optimize EVM, power efficiency, and other wireless performance metrics.

As shown in FIG. 4, peak canceling circuit 200 may include an input summing circuit 204, a first peak detecting circuit 206-1, a second peak detecting circuit 206-2, a third peak detecting circuit 206-3, a first canceling pulse generator (CPG) circuit 208-1, a second canceling pulse generator (CPG) circuit 208-2, and a pulse allocating circuit such as pulse allocator 210.

The first peak detector 206-1 may have an input that receives a first carrier waveform from input 198-1 and an output on which a first clipping value Cv1 is provided. Peak detector 206-1 may be used to monitor the first carrier waveform for any peaks and in response to detecting a peak in the first carrier waveform that exceeds a first predetermined threshold, outputting clipping value Cv1 that is proportional to the amount by which the detected peak exceeds the first predetermined threshold (e.g., first clipping value Cv1 may be computed by taking the difference between a detected peak in the first carrier waveform and the first predetermined threshold).

The second peak detector 206-2 may have an input that receives a second carrier waveform from input 198-2 and an output on which a second clipping value Cv2 is provided. Peak detector 206-2 may be used to monitor the second carrier waveform for any peaks and in response to detecting a peak in the second carrier waveform that exceeds a second predetermined threshold, outputting clipping value Cv2 that is proportional to the amount by which the detected peak exceeds the second predetermined threshold (e.g., clipping value Cv2 may be computed by taking the difference between a detected peak in the second carrier waveform and the second predetermined threshold). In general, the first predetermined threshold used by the first peak detector 206-1 may be equal to or different than the second predetermined threshold used by the second peak detector 206-2. Different standards may set different peak detection threshold levels.

Input summing circuit 204 may have a first input that receives the first carrier waveform from input 198-1, a second input that receives the second carrier waveform from input 198-2, and an output on which a corresponding aggregated waveform (i.e., a waveform that is computed by taking the sum of the first and second carrier waveforms) is provided.

The third peak detector 206-3 may have an input that receives the aggregated waveform from the output of input summing circuit 204 and an output on which a third clipping value is provided. Peak detector 206-3 may be used to monitor the aggregated carrier waveform for any peaks and in response to detecting a peak in the aggregated waveform that exceeds a third predetermined threshold, outputting a corresponding clipping value that is proportional to the amount by which the detected peak exceeds the third predetermined threshold. Peak detector 206-3 may therefore sometimes be referred to as a sum peak detector. In general, the third predetermined threshold used by peak detector 206-3 may be equal to or different than the first and second predetermined thresholds.

Pulse allocator 210 may receive the clipping information from the first, second, and third peak detectors. In particular, pulse allocator 210 may be configured to analyze the clipping information provided from peak detectors 206-1, 206-2, and 206-3 and output control signals for independently adjusting the amount of peak cancellation that is being applied to each of the first and second carrier waveforms.

For example, pulse allocator 210 may output a first weighting factor W1 at a first output 212-1 and may output a second weighting factor W2 at a second output 212-2. The ratio of W1 to W2 determines the difference in the strength of CFR being performed to each of the first and second carrier waveforms. Consider a scenario in which W1 is two times W2. In this scenario, the peaks in the first waveform will be more attenuated relative to the peaks in the second waveform. Consider another scenario in which W1 and W2 are equal. In this scenario, the peaks in the first and second carrier waveforms should be attenuated by the same factor. The computation of weighting factors W1 and W2 are based on a variety of factors, which includes clipping information related solely with the first carrier waveform (e.g., Cv1), clipping information related solely with the second carrier waveform (e.g., Cv2), and also clipping information related with the aggregated waveform and other parameters, which will be described in more detail below.

First CPG 208-1 may have a first input that receives the first carrier waveform from input 198-1, a second input that receives clipping information from peak detector 206-1, a third input that receives first control signal W1 from allocator 210, and an output on which a first peak canceled waveform is generated. First CPG 208-1 may be used to generate cancellation pulses that cancel out with detected peaks in the first waveform based on the received clipping information and the first control signal W1. For example, the degree by which the detected peaks are attenuated may depend on the value of W1. If W1 is high, the detected peaks may be greatly attenuated. If W2 is low, the detected peaks may be attenuated by a relatively lower amount.

Second CPG 208-2 may have a first input that receives the second carrier waveform from input 198-2, a second input that receives clipping information from peak detector 206-2, a third input that receives second control signal W2 from allocator 210, and an output on which a second peak canceled waveform is generated. Second CPG 208-2 may be used to generate cancellation pulses that cancel out with detected peaks in the second waveform based on the received clipping information and second control signal W2. For example, the degree by which the detected peaks in the second waveform are attenuated may depend on the value of W2. If W2 is low, the detected peaks may be slightly attenuated. If W2 is high, the detected peaks may be attenuated by a relatively greater amount.

Peak canceling circuit 200 arranged in this way may output the first and second peak canceled waveforms at the output of CPGs 208-1 and 208-2, respectively. These peak canceled output waveforms may be aggregated using output summing circuit 202. The waveform generated at the output of summing circuit 202 using this approach may be performance optimized for each of the different carriers/standards being supported by wireless communications circuitry 100 (FIG. 2).

Figure 5:
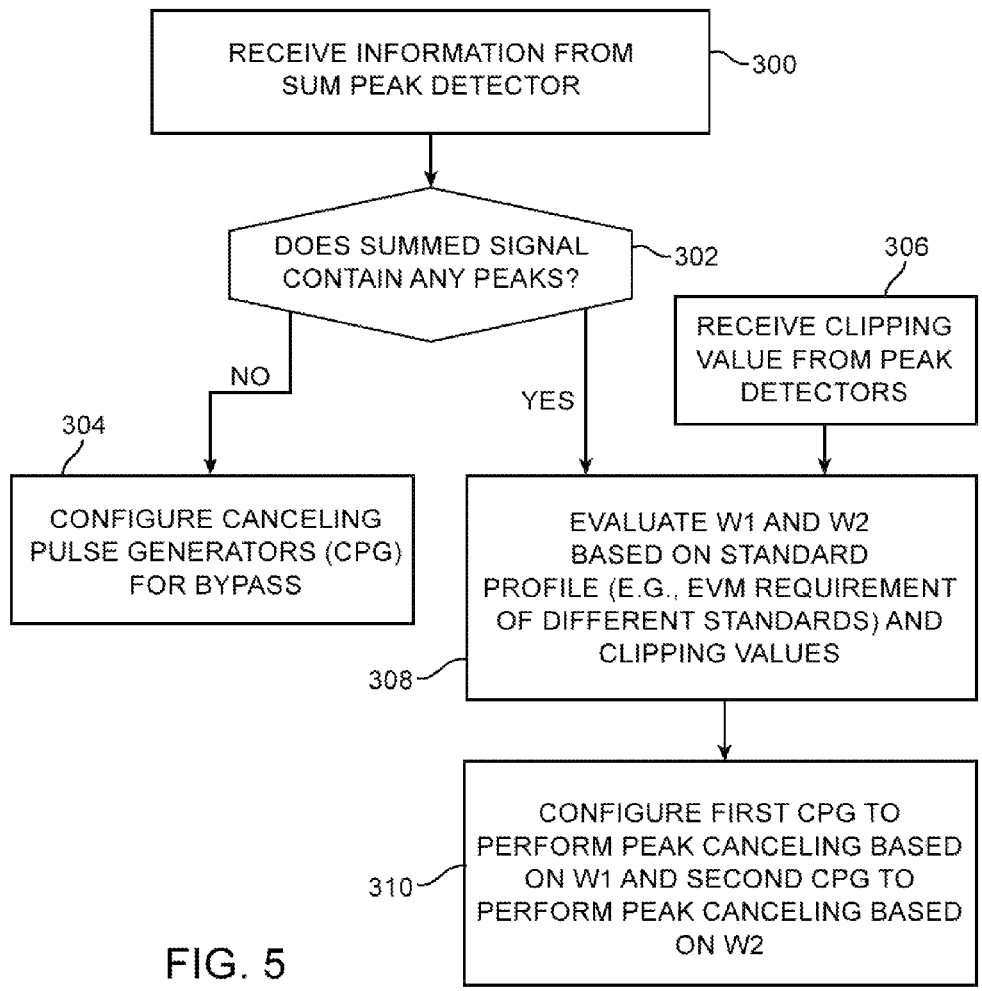
FIG. 5 is a flow chart of illustrative steps for operating a pulse allocator of the type shown in FIG. 4 in accordance with an embodiment of the present invention.

FIG. 5 is a flow chart of illustrative steps involved in operating pulse allocator 210 of the type described in connection with FIG. 4. At step 300, pulse allocator 210 may receive clipping information from sum peak detector 206-3. At step 302, the pulse allocator may determine based on the clipping information received at step 300 whether the aggregated signal at the output of input summing circuit 204 contains any peaks.

If the aggregated signal does not contain any peaks, pulse allocator 210 may configure both CPGs 208-1 and 208-2 for bypass (step 304). During bypass mode, the peak canceling function of CPGs 208-1 and 208-2 should be temporarily suspended (e.g., each of the canceling pulse generators 208 may simply pass through the carrier waveforms without making any alterations). This could be accomplished by setting W1 and W2 to a predetermined critical value of zero (as an example). Operated in this way, waveforms having complementary peaks that cancel out with one another would be allowed to be summed together without unnecessarily performing any signal clipping by CPGs 208, thereby maximizing EVM.

If the aggregated signal does contain at least one peak, processing may proceed to step 308. Meanwhile at step 306, allocator 210 may receive clipping values Cv1 and Cv2 from peak detectors 206-1 and 206-2, respectively.

At step 308, pulse allocating circuit 210 may evaluate weighting factors W1 and W2 based on standard profiles (e.g., based on the specified EVM requirements of the different standards currently in use) and/or the received clipping values Cv1 and Cv2. For example, consider a scenario in which the first waveform is modulated according to 3GPP's Long-Term Evolution (LTE) standard and the second waveform is modulated according to the W-CDMA standard, then the EVM requirements for the first and second waveforms may be set to 9% and 17.5%, respectively. In this example, factor W2 may be set to be greater than factor W1 so that CPG 208-2 is configured to clip more than CPG 208-1 (since the EVM requirements for the second waveform is more severe). As described above, the weighting factors may also be a function of clipping values Cv1 and Cv2. For example, a high clipping value of Cv1 relative to Cv2 may skew the weighting factor more towards W1 to ensure than the first carrier waveform is adequately attenuated prior to being summed with the second carrier waveform.

In general, wireless communications circuitry 100 can be configured to support a wide range of wireless communications standards including but not limited to: cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, and the "4G" Long Term Evolution (LTE) protocol, MIMO (multiple input multiple output) protocols, antenna diversity protocols, internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, and other suitable radio access technologies. Pulse allocator 210 may include an internal look-up table that sets weighting factors W1 and W2 to desired values for different combinations of wireless standards/carriers currently being supported. These values can be predetermined based on known performance requirements such as EVM requirements and/or may be computed dynamically in real time based on known wireless performance requirements and computed clipping values (e.g., based on clipping information provided from peak detectors 206-1, 206-2, and 206-3).

At step 310, pulse allocator 200 may feed weighting factor W1 to CPG 208-1 to configure CPG 208-1 to perform a first amount of peak canceling based on W1 while feeding weighting factor W2 to CPG 208-2 to configured CPG 208-2 to perform a second amount of peak canceling based on W2. Weighting factors W1 and W2 may serve as scaling factors that affect the magnitude of the canceling pulses generated by CPGs 208 (e.g., by CPG 208-1 and by CPG 208-2). Operated in this way, waveforms having different wireless performance requirements may be applied different amounts of CFR at CPGs 208 prior to being summed at circuit 202. In scenarios in which carrier waveforms having similar performance criteria, the carrier waveform having more pronounced peaks may be assigned a higher CFR weighting factor than the carrier waveform having smaller peaks.

The steps described in FIG. 5 are merely illustrative. Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Figure 6:
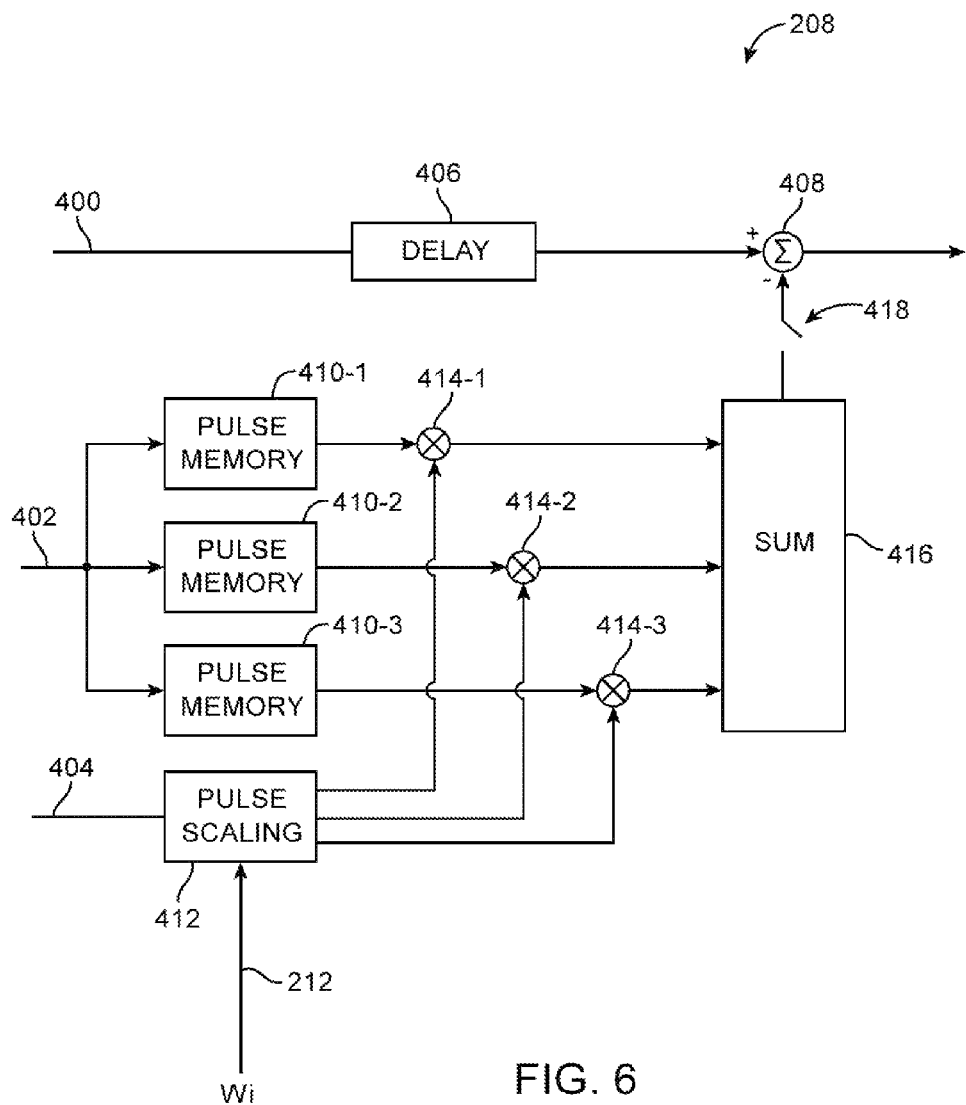
FIG. 6 is a diagram of an illustrative canceling pulse generator in accordance with an embodiment of the present invention.

FIG. 6 is a diagram of a canceling pulse generator (CPG) 208 of the type that can be used to peak canceling circuit 200 in FIG. 4. As shown in FIG. 6, CPG 208 may include a delay circuit 406, a waveform subtraction circuit 408, multiple pulse memory blocks 410 (e.g., pulse memory module 410-1, pulse memory module 410-2, and pulse memory module 410-3), multiplication circuits 414 each of which is associated with a respective one of the pulse memory modules 410, a pulse scaling circuit 412, and a pulse summing circuit 416.

Delay circuit 406 may have an input 400 that receives an incoming carrier waveform from one of inputs 198 (FIG. 4) and an output on which a delayed version of the incoming carrier waveform is provided. The amount of delay provided by circuit 406 can be adjusted to ensure that the canceling pulses generated at the output of circuit 416 are phase aligned to the detected peaks (if any) in the incoming waveform.

Subtractor 408 may have a first (positive) input that receives the delayed version of the input waveform via delay circuit 406, a second (negative) input that receives canceling pulses circuit 416, and an output on which a peak canceled waveform is generated. As shown in FIG. 6, a switch 418 may be interposed between subtraction circuit 408 and pulse summing circuit 416 to help bypass CFR. For example, switch 418 may be deactivated (i.e., turned off in the open state) when the aggregated signal at the output of input summing circuit 204 does not contain any peaks during bypass mode and may otherwise be activated (i.e., turned on in the closed state) during non-bypass mode.

The different pulse memory blocks 410 may receive clipping values at input 402 and may contain different selections of impulse waveforms, which are band-limited to the frequency range of its input signal. Pulse memory blocks 410 may output corresponding impulse waveforms which are then scaled by corresponding multiplication circuits 414. Multiplication circuits 414 may receive a scaling factor from pulse scaling circuit 412. The scaling factor that is output to each multiplication circuit 414 may depend on the clipping values at input 404 and on the weighting factor Wi provided for pulse allocator 210 via path 212.

The multiplication circuits 414 may output the scaled cancellation pulses to pulse summing circuit 416. The pulse summing circuit 416 may then output the summed pulse waveform to subtractor 408. Configured in this way, canceling pulse generator 208 can be used to cancel one or more peaks in the incoming waveform by an amount specified by the clipping values output by peak detector 206 and by a weighting factor output by pulse allocator 210. The example of FIG. 6 in which CPG 208 has three pulse memory blocks 410 is merely illustrative. If desired, CPG 208 may include less than three pulse memory blocks or more than three pulse memory blocks to help perform any suitable type of pulse cancellation operation.

Figure 7:
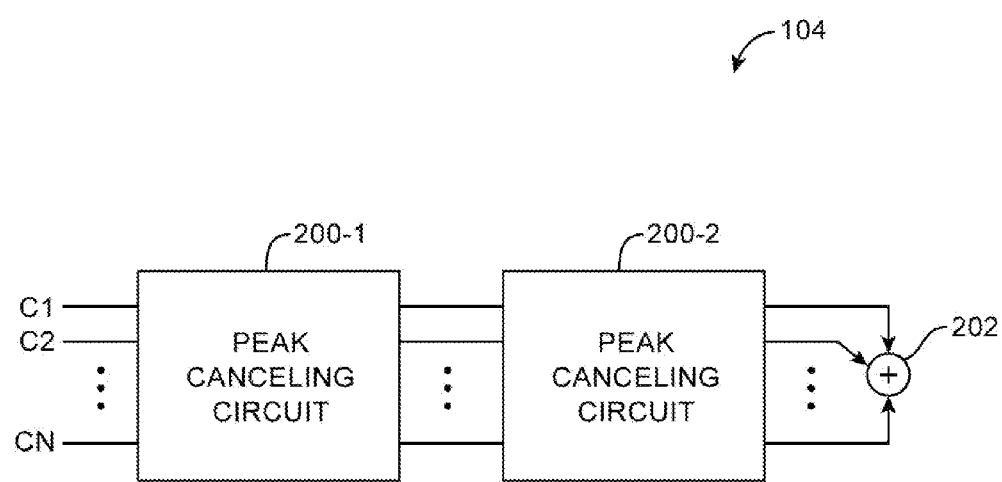
FIG. 7 is a diagram of illustrative peak cancellation circuitry for iteratively cancelling signal peaks in accordance with an embodiment of the present invention.

Peak cancellation circuitry 104 may include more than one peak canceling circuit 200 coupled in series for iteratively cancelling more peaks (see, e.g., FIG. 7). As shown in FIG. 7, circuitry 104 may include a first peak canceling circuit 200-1 connected in series with a second peak canceling circuit 200-2, followed by waveform summing circuit 202 for waveform aggregation prior to being transmitted. This arrangement may allow circuitry 104 to cancel out double the number of peaks than if only one instance of circuit 200 was used. If desired, circuitry 104 may include at least three, at least five, or any suitable number of peak canceling circuits 200 coupled in series to obtain the desired CFR performance.

The exemplary configuration of peak canceling circuitry 104 in FIG. 4 in which only two carrier waveform paths are supported is merely illustrative and does not limit the scope of the present invention. In general, this technique of performing intelligent CFR by selectively weighting the peak cancellation of the different paths and by selectively bypassing peak cancellation at opportune times can be extended to support systems handling three or more carriers or standards.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA Corporation.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. Circuitry, comprising:
a first input that receives a first carrier waveform;
a second input that receives a second carrier waveform;
a first circuit that receives the first carrier waveform;
a second circuit that receives the second carrier waveform, wherein the first and second circuits perform peak cancelation operations on the first and second waveforms in a first mode and bypasses the peak cancellation operations in a second mode, and wherein the first and second circuits generate corresponding waveforms in the first and second modes;
a summing circuit that receives the first and second carrier waveforms from the first and second inputs, respectively, and that outputs a combined waveform; and
a peak detection circuit that receives the combined waveform from the summing circuit and that outputs values indicative of the mode in which the first and second circuits operate.

2. The circuitry defined in claim 1, further comprising: outputs that are coupled to at least one antenna.

3. The circuitry defined in claim 1, wherein the first circuit performs a first adjustable amount of peak cancelation on the first carrier waveform, and wherein the second circuit performs a second adjustable amount of peak cancelation on the second carrier waveform.

4. The circuitry defined in claim 1, further comprising:
a second peak detection circuit that performs peak detection operations on only the first carrier waveform; and
a third peak detection circuit that performs peak detection operations on only the second carrier waveform.

5. The circuitry defined in claim 1, wherein the first carrier waveform is transmitted according to a first wireless standard, and wherein the second carrier waveform is transmitted according to a second wireless standard, the circuitry further comprising:
an allocation circuit that takes into account different performance requirements of the first and second wireless standards and that adjusts the amount of peak cancellation that is performed on the first and second carrier waveforms by the first and second circuits, respectively.

6. A method of operating peak cancelation circuitry, comprising:
receiving a first carrier waveform at a first input;
receiving a second carrier waveform at a second input;
with a summing circuit, combining the first and second carrier waveforms into an aggregated waveform;
with a peak detector, performing peak detection on the aggregated waveform and outputting a result;
with a first canceling pulse generator circuit, receiving the first carrier waveform, a first canceling pulse, and a first weighting factor that is computed from the result, and performing a first adjustable amount of peak canceling on the first carrier waveform based on the first canceling pulse and the first weighting factor to generate a corresponding first output waveform; and
with a second canceling pulse generator circuit, receiving the second carrier waveform, a second canceling pulse, and a second weighting factor that is computed from the result, and performing a second adjustable amount of peak canceling on the second carrier waveform based on the second canceling pulse and the second weighting factor to generate a corresponding second output waveform.

7. A method of operating peak cancelation circuitry, comprising:
receiving a first carrier waveform at a first input;
receiving a second carrier waveform at a second input;
with a first canceling pulse generator circuit, receiving the first carrier waveform and performing a first adjustable amount of peak canceling on the first carrier waveform and generating a corresponding first output waveform;
with a second canceling pulse generator circuit, receiving the second carrier waveform and performing a second adjustable amount of peak canceling on the second carrier waveform and generating a corresponding second output waveform;
summing the first and second output waveforms;
with a summing circuit, combining the first and second carrier waveforms into an aggregated waveform;
with a first peak detector, performing peak detection on the aggregated waveform;
with a second peak detector, receiving the first carrier waveform from the first input and performing peak detection on the first carrier waveform;
with a third peak detector, receiving the second carrier waveform from the second input and performing peak detection on the second carrier waveform; and
controlling the first and second canceling pulse generator circuits based on outputs of the first, second, and third peak detectors.

8. The method defined in claim 7, further comprising:
with an allocation circuit, receiving clipping information from the first, second, and third peak detectors.

9. The method defined in claim 8, further comprising:
with the allocation circuit, determining from the received clipping information whether the aggregated waveform contains any peaks.

10. The method defined in claim 9, wherein controlling the first and second canceling pulse generator circuits comprises:
in response to determining that the aggregated waveform contains at least one peak, generating adjustable control signals to the first and second canceling pulse generator circuits with the allocation circuit.

11. The method defined in claim 9, wherein controlling the first and second canceling pulse generator circuits comprises:
in response to determining that the aggregated waveform does not contain any peaks, configuring the first and second canceling pulse generator circuits in bypass mode with the allocation circuit.

12. Peak cancelation circuitry, comprising:
a first input that receives a first carrier waveform;
a second input that receives a second carrier waveform;
a first canceling pulse generator that receives the first carrier waveform from the first input;
a second canceling pulse generator that receives the second carrier waveform from the second input;
a summing circuit that receives the first carrier waveform from the first input, that receives the second carrier waveform from the second input, and that outputs a combined waveform; and
a pulse allocation circuit that receives clipping information on the first carrier waveform, the second carrier waveform, and the combined waveform and that outputs control signals that adjust the amount of peak cancelation that is being performed by the first and second canceling pulse generators on the first and second carrier waveforms.

13. The peak cancelation circuitry defined in claim 12, further comprising:
a first peak detector that performs peak detection on only the first carrier waveform; and
a second peak detector that performs peak detection on only the second carrier waveform.

14. The peak cancelation circuitry defined in claim 13, further comprising:
a third peak detector that performs peak detection on the combined waveform.

15. The peak cancelation circuitry defined in claim 12, wherein the pulse allocation circuit configures the first and second canceling pulse generators in bypass mode in response to determining that the combined waveform does not contain any peaks.

* * * * *